March 22, 1955  M. G. SESSLER  2,704,428

DOG TRAINING HARNESS

Filed Jan. 19, 1954

Milt Gordon Sessler
INVENTOR.

BY
Attorneys

United States Patent Office 2,704,428
Patented Mar. 22, 1955

2,704,428

DOG TRAINING HARNESS

Milt Gordon Sessler, Klamath Falls, Oreg.

Application January 19, 1954, Serial No. 404,963

2 Claims. (Cl. 54—71)

The present invention relates to new and useful improvements in training devices for bird dogs to teach the dog to range and search with its head held high for increased efficiency in the action of the dog when hunting.

An important object of the invention is to provide a dog training device of simple and practical construction, which is efficient and reliable in use, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
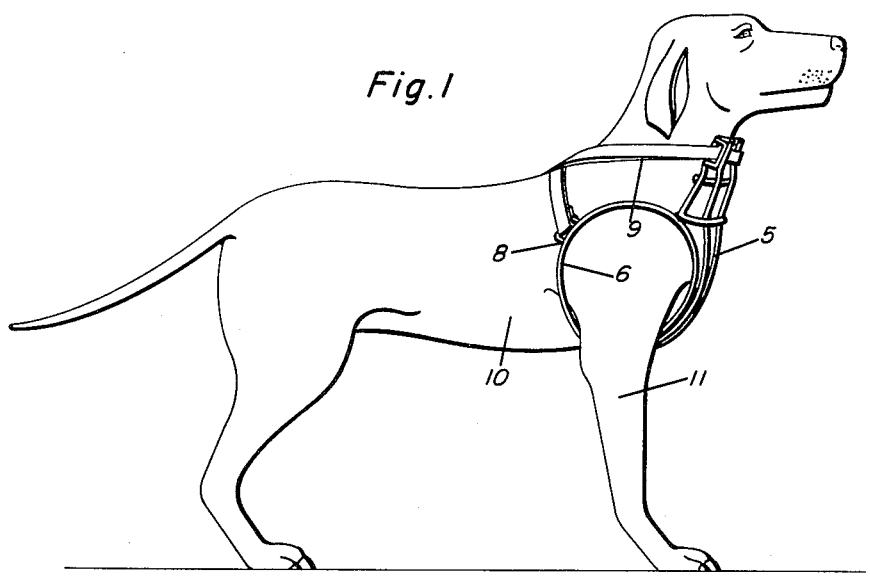
Figure 1 is a side elevational view of the device applied to a dog.
Figure 3:
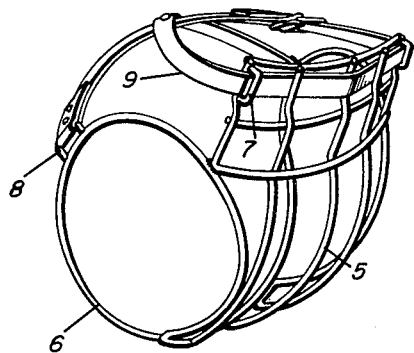
Figure 3 is a perspective view.
Figure 2:
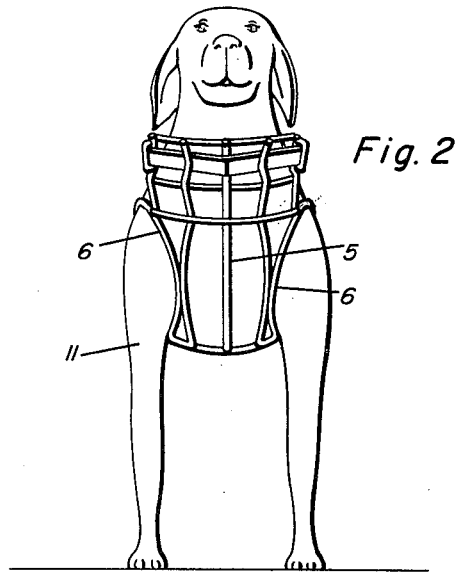
Figure 2 is a front elevational view.

Referring now to the drawing in detail, wherein for the purpose of illustration I have disclosed a preferred embodiment of my invention, the numeral 5 designates a reticulated wire chest frame having edgewise upstanding leg rings 6 connected thereto at the side edges of the frame and extending in a rearward direction with respect to the frame.

Guide loops 7 are secured to the upper side edges of the chest frame and strap attaching loops 8 are secured to the rear portion of the rings 6.

An adjustable leather strap 9 is laced through the loops 7 and also through the mesh of the frame adjacent the upper edge of the latter to extend the strap transversely of the frame and the strap extends rearwardly from the loops 7 and is crossed behind the neck of a dog 10 and with the ends of the strap attached to the loop 8 to secure the chest frame 5 on the chest of the dog and with the front legs 11 of the animal inserted in the rings 6.

In this position, the upper edge of the frame 5 is arranged horizontally under the head of the dog and closely under the jaws thereof to prevent the dog from lowering its head.

All portions of the frame which might tend to irritate or be uncomfortable to the animal may be suitably padded.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An animal training device comprising a rigid reticulated chest frame, rigid annular members supported at the sides of the frame in an edgewise vertical position and adapted to receive the front legs of an animal, and an attaching strap securing the frame on the chest of the animal and closely under the head thereof to hold the head of the animal raised.

2. An animal training device comprising a reticulated chest frame, an annular member fixed to each side of the frame and supported in an edgewise vertical position and extending in a rearward direction with respect to the frame, said annular member being adapted to receive the front legs of an animal, and an attaching strap laced through the reticulations of the frame adjacent the upper edge of the latter and said strap being crossed behind the head of the dog and attached to said annular members to secure the chest frame closely under the head of the dog to hold the head raised.

References Cited in the file of this patent

UNITED STATES PATENTS

| | | |
|---|---|---|
| 295,712 | Anderson | Mar. 25, 1884 |
| 1,685,435 | Philbrick | Sept. 25, 1928 |
| 2,313,833 | Marmet | Mar. 16, 1943 |
| 2,670,712 | Patience et al. | Mar. 2, 1954 |

OTHER REFERENCES

The Journal of Bone and Joint Surgery, Jan. 1951, page 43.

Ortho Appliance Atlas, 1952, page 226.